(12) United States Patent
Zink et al.

(10) Patent No.: US 12,285,746 B2
(45) Date of Patent: Apr. 29, 2025

(54) SELECTIVE HYDROISOMERIZATION CATALYST

(71) Applicant: UOP LLC, Des Plaines, IL (US)

(72) Inventors: Steven F. Zink, Batavia, IL (US); David A. Lesch, Hoffman Estates, IL (US); Wei Pan, Hoffman Estates, IL (US); Joseph T. Kozlowski, Brookfield, IL (US); Sesh Prabhakar, Hoffman Estates, IL (US); Sergio Sanchez, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 20 days.

(21) Appl. No.: 18/220,741

(22) Filed: Jul. 11, 2023

(65) Prior Publication Data

US 2023/0347327 A1    Nov. 2, 2023

Related U.S. Application Data

(63) Continuation of application No. 17/590,422, filed on Feb. 1, 2022, now Pat. No. 11,697,111.

(60) Provisional application No. 63/145,474, filed on Feb. 3, 2021.

(51) Int. Cl.
    *B01J 29/85*   (2006.01)
    *B01J 21/04*   (2006.01)
    *B01J 23/42*   (2006.01)
    *B01J 27/20*   (2006.01)
    *C10G 45/64*   (2006.01)

(52) U.S. Cl.
    CPC .............. *B01J 29/85* (2013.01); *B01J 21/04* (2013.01); *B01J 23/42* (2013.01); *B01J 27/20* (2013.01); *C10G 45/64* (2013.01); *B01J 2229/18* (2013.01)

(58) Field of Classification Search
    CPC ........ B01J 21/04; B01J 21/18; B01J 2229/18; B01J 2229/20; B01J 2229/42; B01J 23/42; B01J 27/20; B01J 29/068; B01J 29/076; B01J 29/85; B01J 35/396; C10G 45/64; Y02P 30/20
    See application file for complete search history.

(56) References Cited

U.S. PATENT DOCUMENTS

2021/0008533 A1 *  1/2021  Gramiccioni ............ B01J 35/56
2021/0047183 A1 *  2/2021  Eid ........................ B01J 35/651

FOREIGN PATENT DOCUMENTS

| EP | 0209997 A1 * | 1/1987 | |
| WO | 2007107336 A2 | 9/2007 | |
| WO | WO-2016073183 A1 * | 5/2016 | ............ B01J 29/703 |
| WO | 2017112377 A1 | 6/2017 | |

OTHER PUBLICATIONS

Search Report and Written Opinion for 22750628.4 dated Nov. 18, 2024.

* cited by examiner

*Primary Examiner* — Ellen M McAvoy
*Assistant Examiner* — Chantel Graham
(74) *Attorney, Agent, or Firm* — Paschall & Associates, LLC; Mark Goldberg

(57) ABSTRACT

A catalyst is provided for hydrodeoxygenation and hydroisomerization of paraffins having higher activity. The catalyst contains a molecular sieve, such as SAPO-11, a metal component such as platinum and/or palladium or nickel tungsten sulfide or nickel molybdenum sulfide and a binder such as gamma alumina. The catalyst exhibits a high proportion of weak acid sites and a relatively equal distribution of the metal component on the molecular sieve and the binder.

20 Claims, No Drawings

SELECTIVE HYDROISOMERIZATION CATALYST

This application claims priority from U.S. application Ser. No. 17/590,422, filed Feb. 1, 2022, and issued as U.S. Pat. No. 11,697,111 B2 on Jul. 11, 2023, which claims priority to U.S. Provisional Application 63/145,474, filed Feb. 3, 2021, which are incorporated herein in their entirety.

The present invention is directed to a method for producing a catalytically active material and specifically a catalyst for hydroisomerization of a hydrocarbon mixture suitable for use as a diesel fuel, jet fuel, lubricant, or home heating oil as well as a hydroisomerization process employing such a catalyst.

The feed hydrocarbon mixtures of relevance for the present disclosure may originate either from atmospheric or vacuum fractionation of a hydrocarbon mixture with a wide boiling range. The hydrocarbon mixture may originate from a variety of sources, including mineral oils, renewable oils (including oils of vegetable and/or animal origins), and synthetically manufactured hydrocarbons, like, for example, via the well-known Fischer Tropsch reaction from synthesis gas generated, among other, from biomass and coal gasification, natural gas reforming, coke oven gas, and others, as well as a mixture of hydrocarbons from these sources.

As it is well known to the skilled person, e.g. from the European standard EN 590 for diesel fuels, a hydrocarbon mixture may, depending upon its origin, have satisfactory cold flow properties at any temperature for one specific application, while the cold flow properties may need to be improved for certain other applications, often in connection with seasonal variation of temperature (typically in winter), or the cold flow properties may need improvement throughout the year.

Problematic cold flow properties i.e. crystallization or partial solidification at low temperatures are most commonly related to long (C7+) straight chain n-paraffins, which may be isomerized to form branched isomerized paraffins (i-paraffins), with improved cold flow properties.

Several methods of optimizing cold flow properties are available, and as they all aim at reducing the presence or at least the effect of the wax like n-paraffins these methods are commonly called de-waxing.

Product blending may improve the cold flow properties by dilution of the feedstock with lower boiling streams (for example kerosene) or appropriate additives (depressant of crystal formation) to feedstock oils. Albeit technologically simple, these methods are traditionally expensive.

Products with acceptable cold flow properties may also be obtained by catalytic hydrocracking of feedstocks. This reaction cracks of long n-paraffins thereby producing shorter molecules having satisfactory cold flow properties. Hydrocracking will result in loss of product, due to formation of hydrocarbons boiling outside the desired boiling point range, and large consumption of hydrogen.

A further route to improvement of the cold flow properties of products is catalytic hydroisomerization. Appropriate catalysts are active in promoting hydroisomerization reactions, providing isomers with various degree of branching from the original straight chain paraffins.

Hydroisomerization allows higher yield of the product fraction of interest and a lower consumption of hydrogen compared to hydrocracking. The process requires presence of hydrogen.

The process of dewaxing or hydroisomerization is carried out in the presence of a catalyst, which in accordance with the present disclosure comprises a noble metal component selected from Group VIII of the Periodic System and being supported on a carrier comprising a metal oxide such as alumina, silica, titania or silica-alumina or combinations of these, as well as a molecular sieve having a topology such as AEI, AEL, AFO, AFX, ATO, BEA, CHA, FAU, FER, MEL, MFI, MOR, MRE, MTT, MWW or TON.

As in most chemical reactions, especially of complex mixtures such as a diesel pool, multiple parallel reactions may occur. These parallel reactions may in the case of dewaxing through hydroisomerization often be hydrocracking reactions having small hydrocarbons as products, which are not suited for being part of a diesel pool, and therefore represent a yield loss, and thus an economical loss as well as a cost due to consumption of hydrogen. Throughout time the yield has been optimized especially by optimizing process conditions and the catalyst used.

As used herein the value of a cold flow parameter is represented by a temperature reflecting the viscosity of a hydrocarbon mixture at low temperatures, including the parameters cloud point, pour point, freezing point and cold filter plugging point (CFPP). Common for these parameters are that they define the requirement to low viscosity of diesel under cold conditions as it is also specified in the standard EN 590 specifying requirements to diesel. For most practical purposes the parameters are affected by the same chemical mechanisms, and the terminology "improvement of cold flow properties" or "improvement of any one of these parameters" shall unless stated otherwise be understood as equivalent.

As used herein, i-paraffins or iso-paraffins shall, as understood by the skilled person in the field of refinery technology, be considered as any branched paraffin, contrary to the strict definition of iso-paraffins being paraffins having a single methyl group proximate to carbon chain end.

As used herein in the following, "feedstock" or "feedstock oil" shall comprise any stream, originating from one or more of mineral oils, renewable oils or from a product from Fischer Tropsch synthesis from synthesis gas, with cold flow properties requiring improvement.

A material catalytically active in hydroisomerization shall be understood as a material having significant catalytic activity for hydroisomerization under the conditions used, but as it will be realized by the skilled person, most reactions will show an amount of side reactions, and even where side reactions are comparable in extent or exceeding the desired hydroisomerization reaction the material shall be considered catalytically active in the hydroisomerization, where an amount of hydroisomerization takes place.

As used herein the unit NL/L shall indicate the volume of gas (in normal liters, i.e. liters at 0° C. and 1 bar) per volume of liquid (in liters at 15° C. and 1 bar).

As used herein the term precursor for a catalytically active material shall be understood as a material being convertible to a catalytically active material by an activation process such as reduction.

As used herein, the term topology of a molecular sieve is used in the sense described in the "Atlas of Zeolite Framework Types," Sixth Revised Edition, Elsevier, 2007, and three letter framework type codes are used in accordance herewith.

In a broad form the present disclosure relates to a precursor for a catalytically active material or a catalytically active material comprising a dehydrogenating metal function such as that provided by platinum, palladium, nickel, nickel molybdenum sulfide or nickel tungsten sulfide, a molecular sieve and a metal oxide support, characterized in that the metal function is distributed between the molecular sieve and the support with about 50% or 60% or 65% of the metal function distributed on the molecular sieve with the associated benefit of such a catalytically active material being highly active and selective towards dewaxing or hydroisomerization.

In a further embodiment said molecular sieve is one or more materials taken from the group having AEI, AEL, AFO, AFX, ATO, BEA, CHA, FAU, FER, MEL, MFI, MOR, MRE, MTT, MWW or TON topology such as EU-2, ZSM-11, ZSM-22, ZSM-23, ZSM-48, SAPO-5, SAPO-11, SAPO-31, SAPO-34, SAPO-41, SSZ-13, SSZ-16, SSZ-39, MCM-22, zeolite Y, ferrierite, mordenite, ZSM-5 or zeolite beta, with the associated benefit of such materials being active in dewaxing or hydroisomerization of linear hydrocarbons. SAPO-11 was found of particular utility.

This disclosure is of a catalytically active material comprising a metal component, a molecular sieve and a metal oxide support, wherein about 40-60% of said metal component is dispersed on said molecular sieve and about 40-60% of said metal component is dispersed on said metal oxide support. The metal component may be selected from platinum, palladium, nickel, nickel molybdenum sulfide or nickel tungsten sulfide. Preferably, the metal component is selected from platinum or nickel tungsten sulfide. The metal component is found to be distributed fairly evenly between the molecular sieve and the metal oxide support and may be equal with about 50% of the metal component dispersed on said molecular sieve and 50% of the metal component dispersed on the metal oxide support. The metal oxide support may be taken from the group comprising alumina, silica, silica-alumina and titania or mixtures thereof. Preferably the metal oxide support is alumina and preferably it is gamma alumina. The catalytically active material contains a molecular sieve having AEL topology and more specifically it is SAPO-11. Most of the acid sites on the SAPO-11 are weak to moderate acid sites. More specifically, at least 50% of the total acid sites on the SAPO-11 are weak acid sites and at least 60-80% of external acid sites on said SAPO-11 are weak acid sites.

Materials catalytically active in hydroisomerization are typically particles having a diameter of a few millimeters. The production typically involves the formation of a stable support, followed by impregnation of active metals. The stable support typically comprises a metal oxide as well as a molecular sieve, which may be a zeolite. The stable support is produced with a high porosity, to ensure maximum surface area, and it is typically desired to impregnate active metal over the full volume of the support.

Renewable fuels derived from hydrodeoxygenation of renewable feedstocks, such as from vegetable oils and animal-derived tallows and blends thereof are comprised of n-paraffins, which have poor cold flow properties, based on their cloud point (ASTM D 2500) and freeze point (ASTM D 1655: Jet A −40 deg C. max, Jet A-1-47 deg C. max by D 5972, D 7153, D 7154, or D 2386) and usually require hydroisomerization to improve the cold flow properties. The existing catalysts that are used include supported hydroisomerization catalysts that are bi-functional, having a dehydrogenating metal function (such as Pt, Pd, Ni, Pt/Pd, $Ni_xMo_yS_z$, $Ni_xW_yS_z$), an isomerizing acid function, which is supplied by a shape-selective molecular sieve (such as a 10-ring AEL) A third component of supported hydroisomerization catalysts is the binder which often is comprised principally of gamma alumina. An efficient dewaxing catalyst would have a preferred combination (type, concentration) of dehydrogenating metal function, isomerizing acid function, and binder component that provides exceptional selectivity (yield of 250-700° F. fraction) at the desired extent of cold flow property adjustment (e.g. cloud point reduction).

An alternative to the afore-mentioned identification of a preferred, supported hydroisomerization catalyst would be to process the hydrodeoxygenated effluent with a bi-functional catalyst that does not include a shape-selective molecular sieve component, or substitutes a non-shape selective molecular sieve (e.g. faujasite) for the shape-selective molecular sieve.

Compared to the prior art, the present invention is unique as regards the molecular sieve employed in the role of isomerizing acid function. Compared to a catalyst with a support comprised entirely of non-shape selective supports such as amorphous silica alumina, with the same type and concentration of metal (e.g Pt) dispersed onto the support, the new catalyst retains at least 6% more 250-700 F distillation fraction at a −30 deg C. total liquid product cloud point. The temperature required to achieve the same cloud point reduction is; that is, the activity is, within 5-10 deg F.

The molecular sieve AEL SAPO-11 was extruded with pseudo-boehmite that had been peptized with aqueous nitric acid. The extrudates were dried, then calcined, converting the pseudo-boehmite to gamma alumina. Conditions typical of a calcination are: 30-90-minute residence time, 1200-1500 deg F. The resulting calcined support was impregnated with 0.25 wt % Pt (e.g., TAPC tetraammonium platinum chloride Pt precursor), then oxidized at 700-900 deg F. for 30-90 minutes in a furnace/oxidizer. The catalyst is then reduced with flowing hydrogen for 4-6 hours at 650-700 deg F. After the catalyst's metal has been reduced, the catalyst may process a hydrodeoxygenated renewable feedstock (up to 100%) at the following processing condition ranges to achieve the desired cold flow property target(s): 500-1400 psig, 1500-10000 Scfb hydrogen: feed, 550-750 deg F., 0.25-2.5 LHSV.

X-ray chemical mapping of a sample of catalyst prepared as described above showed that the platinum levels on the SAPO-11 and the gamma alumina were essentially equivalent with 0.27+0.07 wt % Pt/SAPO-11 and 0.29+0.09 wt % Pt/alumina. Further analysis was made of the size of the platinum particles was made with 83.6% of all platinum found in particles of 2 nm or less. 50% of the platinum was on the molecular sieve which means that 46% of the total platinum is less than 2 nm and located on the sieve. The chemical mapping was done by scanning transmission electron microscopy. Nanoparticle diameters were determined taking the average of every possible diameter that traverses the center of a particle between two tangent points. Atom counting was accomplished by collecting a series of images at atomic resolution (5.1 M× magnification) over sufficiently thin regions of the support. Intensity contributions from the individual atoms were counted for scanned areas of 265 nm2 for each sample. Topography was ignored for simplicity and thus individual atom density per square area represented the number of individual atoms per area of image as opposed to surface area of the support.

Additional characterization of the materials was made by measuring the acidity of the molecular sieve. In the tests that were performed, the SAPO-11 was tested for external acidity by testing for absorption of collidine and for total acidity by absorption of pyridine. Samples were each about 10 mg, ground to a fine powder and pressed into 13 mm diameter self-supporting pellets. Separate experiments were run for each sample for pyridine and collidine. The samples were pretreated in helium at 500° C. for 2 hours, then adsorbing pyridine or collidine at 150° C. for 1 hour and then three discrete desorptions for 1 hour each at 150° C., 300° C. and 450° C. Bronsted acid strength distribution for total acidity showed mainly weak and moderate sites. For the external sites, for the SAPO-11 powders, the acid strength distribution skewed to mainly weak sites followed by moderate sites. There were very few strong sites. The results of the tests with pyridine were weak 0.07, moderate 0.06, strong 0.0005 with a total of 0.14 with all measurements being area/mg. Similar results were found for acidity of external sites with the relative value of weak sites of 0.11, moderate sites of 0.03, strong sites of 0.01 and total sites of 0.15.

In another example, the molecular sieve SAPO-11 with the same gamma alumina support was impregnated with a nickel tungsten metal with Ni loading of 1-5 wt % and W loading of 10-30 wt %.

EXAMPLES

Parent Sample of SAPO-11

A parent sample of SAPO-11 was divided into four parts, and each part was formed with alumina, the metal oxide portion, as cylindrical extrudates, then calcined to prepare four catalyst support extrudates. Each of the four support extrudates was impregnated with the same concentration of a Group VIII metal, then oxidized and reduced, activating the catalysts for hydroisomerization. About 40-60% of said metal component was dispersed on the molecular sieve portion and about 40-60% of said metal component was dispersed on the metal oxide portion of the cylindrical extrudate support.

Example 1

The first catalyst support was prepared with the baseline temperature and steam levels. The carbon content was 838 ppm. After impregnation, oxidation, reduction, the catalyst's performance was assessed at a standard operating severity necessary to reduce the cloud point of n-hexadecane feedstock by 48.5° F. The yield of 250-700 F+ product boiling fraction exceeded 90% and this yield served as the baseline of comparison with Examples 2, 3, and 4.

Example 2

The second catalyst support was prepared with the baseline temperature and 120% of the baseline steam level. The carbon content was 590 ppm. After impregnation, oxidation, reduction, the catalyst's performance was assessed at a standard operating severity necessary to reduce the cloud point of n-hexadecane feedstock by 48.5° F. The yield of 250-700 F+ product boiling fraction exceeded that of Example 1 by 0.9%, calculated by difference.

Example 3

The third catalyst support was prepared with the baseline temperature and 140% of the baseline steam level. The carbon content was 221 ppm. After impregnation, oxidation, reduction, the catalyst's performance was assessed at a standard operating severity necessary to reduce the cloud point of n-hexadecane feedstock by 48.5° F. The yield of 250-700 F+ product boiling fraction exceeded that of Example 1 by 1.1%, calculated by difference.

Example 4

The fourth catalyst support was prepared with the baseline temperature+175° F. and 140% of the baseline steam level. The carbon content was 110 ppm. After impregnation, oxidation, reduction, the catalyst's performance was assessed at a standard operating severity necessary to reduce the cloud point of n-hexadecane feedstock by 48.5° F. The yield of 250-700 F+ product boiling fraction exceeded that of Example 1 by 1.8%, calculated by difference.

SPECIFIC EMBODIMENTS

While the following is described in conjunction with specific embodiments, it will be understood that this description is intended to illustrate and not limit the scope of the preceding description and the appended claims.

A first embodiment of the invention is a catalytically active material comprising a metal component, and comprising as a support at least a molecular sieve, a metal oxide, and a carbon material, wherein about 40-60% of the metal component is dispersed on the molecular sieve and about 40-60% of the metal component is dispersed on the metal oxide, and wherein 25 wppm-1000 wppm carbon material is in the support excluding the supported active metal components. An embodiment of the invention is one, any or all of prior embodiments in this paragraph up through the first embodiment in this paragraph wherein 25-500 wppm carbon as carbon material is in the support excluding the supported active metal components. An embodiment of the invention is one, any or all of prior embodiments in this paragraph up through the first embodiment in this paragraph wherein the metal component is selected from platinum, palladium, nickel, combinations of platinum and/or palladium and/or nickel, nickel molybdenum sulfide or nickel tungsten sulfide. An embodiment of the invention is one, any or all of prior embodiments in this paragraph up through the first embodiment in this paragraph wherein the metal component is selected from platinum or nickel tungsten sulfide. An embodiment of the invention is one, any or all of prior embodiments in this paragraph up through the first embodiment in this paragraph wherein about 50% of the metal component is dispersed on the molecular sieve and about 50% of the metal component is dispersed on the metal oxide. An embodiment of the invention is one, any or all of prior embodiments in this paragraph up through the first embodiment in this paragraph, wherein in the precursor the metal oxide support is selected from the group comprising alumina, silica, silica-alumina and titania. An embodiment of the invention is one, any or all of prior embodiments in this paragraph up through the first embodiment in this paragraph wherein the metal oxide is alumina. An embodiment of the invention is one, any or all of prior embodiments in this paragraph up through the first embodiment in this paragraph wherein the metal oxide is gamma alumina. An embodiment of the invention is one, any or all of prior embodiments in this paragraph up through the first embodiment in this paragraph wherein the molecular sieve has AEL framework type. An embodiment of the invention is one, any or all of prior embodiments in this paragraph up through the first embodiment in this paragraph wherein the molecular sieve is SAPO-11. An embodiment of the invention is one, any or all of prior embodiments in this paragraph up through the first embodiment in this paragraph wherein at least 50% of acid sites on the SAPO-11 are weak acid sites. An embodiment of the invention is one, any or all of prior embodiments in this paragraph up through the first embodiment in this paragraph wherein at least 60-80% of external acid sites on the SAPO-11 are weak acid sites.

A second embodiment of the invention is a process for dewaxing a hydrocarbon or a hydrocarbon mixture involving contacting the hydrocarbon or hydrocarbon mixture with a catalytically active material comprising a metal component, and comprising as a support at least a molecular sieve, a metal oxide, and a carbon material, wherein about 40-60% of the metal component is dispersed on the molecular sieve and about 40-60% of the metal component is dispersed on the metal oxide, and wherein 25 wppm-1000 wppm carbon material is in the support excluding the supported active metal components in the presence of hydrogen under dewaxing conditions. An embodiment of the invention is one, any or all of prior embodiments in this paragraph up through the first embodiment in this paragraph wherein 25-500 wppm carbon as carbon material is in the support, excluding the supported active metal components. An embodiment of the invention is one, any or all of prior embodiments in this paragraph up through the first embodiment in this paragraph wherein the metal component is selected from platinum, palladium, nickel, combinations of platinum and/or palladium and or nickel, nickel molybdenum sulfide or nickel tungsten sulfide. An embodiment of the invention is one, any or all of prior embodiments in this paragraph up through the first embodiment in this paragraph wherein the metal component is selected from platinum or nickel tungsten sulfide. An embodiment of the invention is one, any or all of prior embodiments in this paragraph up through the first embodiment in this paragraph wherein about 50% of the metal component is dispersed on the molecular sieve and about 50% of the metal component is dispersed on the metal oxide support. An embodiment of the invention is one, any or all of prior embodiments in this paragraph up through the first embodiment in this paragraph, wherein the molecular sieve is SAPO-11. An embodiment of the invention is one, any or all of prior embodiments in this paragraph up through the first embodiment in this paragraph, wherein the metal oxide support is alumina. An embodiment of the invention is one, any or all of prior embodiments in this paragraph up through the first embodiment in this paragraph, wherein the metal oxide support is gamma alumina.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A catalytically active material comprising a metal component, and comprising as a support at least a molecular sieve, a metal oxide, and a carbon material, wherein a portion of said metal component is dispersed on said molecular sieve and a second portion of said metal component is dispersed on said metal oxide, and wherein carbon as carbon material is in the support, excluding the supported active metal components.

2. The catalytically active material of claim 1 wherein the molecular sieve is one or more materials taken from the group having AEI, AEL, AFO, AFX, ATO, BEA, CHA, FAU, FER, MEL, MFI, MOR, MRE, MTT, MWW or TON topology.

3. The catalytically active material of claim 1 wherein 25-500 wppm carbon as carbon material is in the support, excluding the supported active metal components.

4. The catalytically active material according to claim 1 wherein the metal component is selected from platinum, palladium, nickel, combinations of platinum and/or palladium, and/or nickel, nickel molybdenum sulfide or nickel tungsten sulfide.

5. The catalytically active material according to claim 1 wherein about 50% of the metal component is dispersed on said molecular sieve and about 50% of the metal component is dispersed on the metal oxide.

6. The precursor for a catalytically active material or a catalytically active material according to claim 1, wherein said metal oxide is taken from the group comprising alumina, silica, silica-alumina and titania.

7. A process for dewaxing a hydrocarbon or a hydrocarbon mixture involving contacting said hydrocarbon or hydrocarbon mixture with a catalytically active material comprising a metal component, and comprising as a support at least a molecular sieve, a metal oxide, and a carbon material, wherein a portion of said metal component is dispersed on said molecular sieve and a second portion of said metal component is dispersed on said metal oxide, and wherein carbon as carbon material is in the support, excluding the supported active metal components in the presence of hydrogen under dewaxing conditions.

8. The process of claim 7 wherein 25-500 wppm carbon as carbon material is in the support, excluding the supported active metal components.

9. The process according to claim 7 wherein the metal component is selected from platinum, palladium, nickel, combinations of platinum, and/or palladium, and/or nickel, nickel molybdenum sulfide or nickel tungsten sulfide.

10. The process according to claim 7 wherein the metal component is selected from platinum or nickel tungsten sulfide.

11. The process according to claim 7 wherein about 50% of the metal component is dispersed on said molecular sieve and about 50% of the metal component is dispersed on the metal oxide.

12. The process according to claim 7, wherein said molecular sieve is SAPO-11.

13. The process according to claim 7, wherein a hydrodeoxygenated renewable feedstock is processed to achieve cold flow property target(s) of 500-1400 psig, 1500-10000 scfb hydrogen: feed, 550-750 deg F, and 0.25-2.5 LHSV.

14. A method for making a catalyst comprising extruding a molecular sieve with a pseudo-boehmite to produce an extrudate that is calcined to gamma alumina and then impregnating said gamma alumina and molecular sieve with a metal component to provide an impregnated extrudate, wherein 40-60% of said metal component was dispersed on the molecular sieve portion and about 40-60% of said metal component was dispersed on the gamma alumina, and then oxidizing the impregnated extrudate.

15. The method of claim 14 wherein said catalyst is further processed by being reduced with flowing hydrogen for 4-6 hours at 650-700° F.

16. The method of claim 14 wherein the molecular sieve is one or more materials taken from the group having AEI, AEL, AFO, AFX, ATO, BEA, CHA, FAU, FER, MEL, MFI, MOR, MRE, MTT, MWW or TON topology.

17. The method of claim 14 wherein the molecular sieve is SAPO-11.

18. The method of claim 14 wherein said metal component is selected from platinum, palladium, nickel, combinations of platinum and/or palladium, and/or nickel, nickel molybdenum sulfide or nickel tungsten sulfide.

19. The method of claim 14 wherein said metal component is platinum.

20. The method according to claim 14 wherein about 50% of the metal component is dispersed on said molecular sieve and about 50% of the metal component is dispersed on the gamma alumina.

* * * * *